Sept. 3, 1940.　　　　H. PETERSEN　　　　2,213,885
CYLINDER REBORING MACHINE
Filed March 24, 1938　　　4 Sheets-Sheet 1

INVENTOR.
HANS PETERSEN
BY G. H. Braddock
ATTORNEY

Sept. 3, 1940.  H. PETERSEN  2,213,885
CYLINDER REBORING MACHINE
Filed March 24, 1938  4 Sheets-Sheet 3

INVENTOR.
HANS PETERSEN
BY G. H. Braddock
ATTORNEY

Sept. 3, 1940. H. PETERSEN 2,213,885
CYLINDER REBORING MACHINE
Filed March 24, 1938 4 Sheets-Sheet 4

INVENTOR.
HANS PETERSEN
BY G. H. Braddock
ATTORNEY

Patented Sept. 3, 1940

2,213,885

UNITED STATES PATENT OFFICE 2,213,885

CYLINDER REBORING MACHINE

Hans Petersen, Minneapolis, Minn., assignor to Storm Manufacturing Company, Inc., Minneapolis, Minn., a corporation of Minnesota Application March 24, 1938, Serial No. 197,891

8 Claims. (Cl. 77—2)

This invention has relation to a machine for boring or reboring the cylinders of internal combustion engines, as, for example, the cylinders of automotive vehicle engines.

An object of the invention is to provide a machine for boring or reboring the cylinders of internal combustion engines which will be of novel and improved construction.

A further object is to provide a machine for boring or reboring the cylinders of internal combustion engines wherein will be incorporated various improved features and characteristics of construction novel both as individual entities of the machine and in combination with each other.

A further object is to provide a cylinder boring or reboring machine which will include novel and improved mechanism for accomplishing both the drive of the cutter or cutting means of the machine and the feed of said cutter or cutting means to the work, or along a cylinder being bored or rebored.

A further object is to provide a cylinder boring or reboring machine which will include novel and improved mechanism adapted to be mechanically actuated to the accomplishment of the drive of the cutter or cutting means of the machine, as well as to the accomplishment of the feed of said cutter or cutting means to the work, or along a cylinder being bored or rebored.

A further object is to provide a machine for boring or reboring the cylinders of internal combustion engines which will be mechanically actuated to the accomplishment of the drive of the cutter or cutting means of the machine, and which will include novel and improved mechanism for accomplishing the drive of said cutter or cutting means at any desired or predetermined, nicely and accurately controlled and regulated rate of speed.

A further object is to provide a machine for boring or reboring the cylinders of internal combustion engines which will be mechanically actuated to the accomplishment of the feed of the cutter or cutting means to the work, or along a cylinder being bored or rebored, and which will include novel and improved mechanism for accomplishing the feed of said cutter or cutting means at any desired or predetermined, nicely and accurately controlled and regulated rate of speed.

A further object is to provide a cylinder boring or reboring machine which will include a cutter or cutting means to be driven and to be fed along a cylinder to be bored or rebored, and which will also include novel and improved mechanism for accomplishing both the drive and the feed of said cutter or cutting means each at any desired or predetermined, controlled and regulated rate of speed.

And a further object is to provide a cylinder boring or reboring machine which will include several novel and improved constructional features appurtenant to the accomplishment of boring or reboring operations upon the cylinders of internal combustion engines. With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Figure 1:
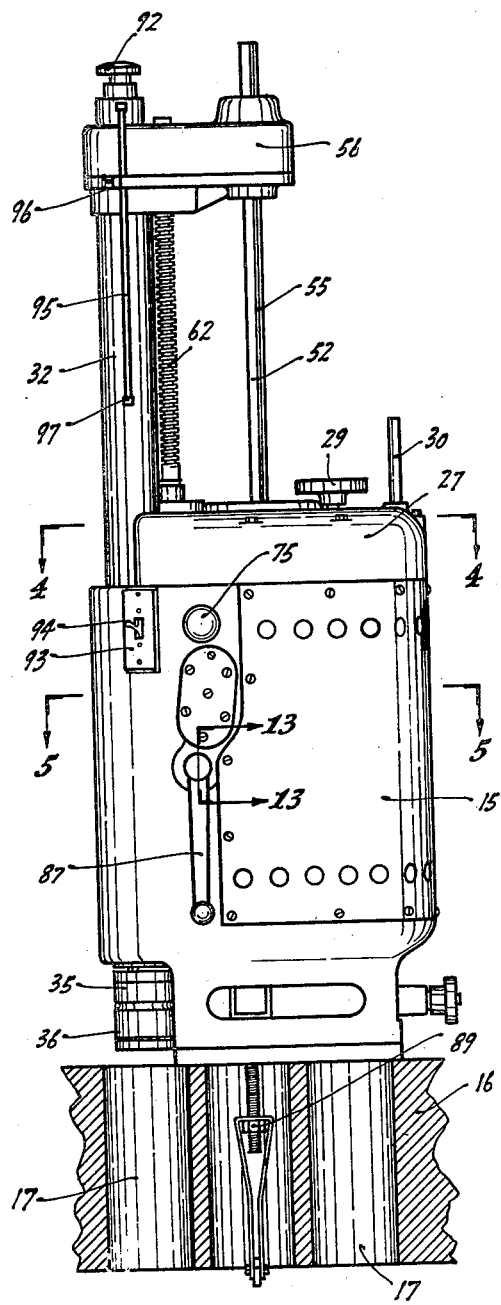
Fig. 1 is a side elevational view of a cylinder boring or reboring machine in which the features and characteristics of the invention are incorporated, disclosing said machine secured upon an engine block in position to commence a reboring operation upon a usual cylinder provided in said engine block.
Figure 2:
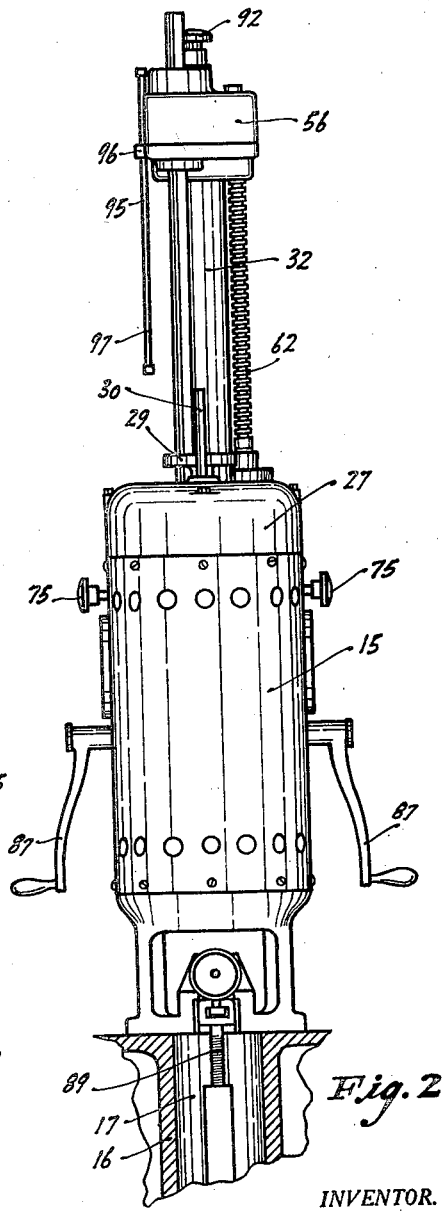
Fig. 2 is an end elevational view of the machine of Fig. 1, as said machine would appear from the right in said Fig. 1.
Figure 3:
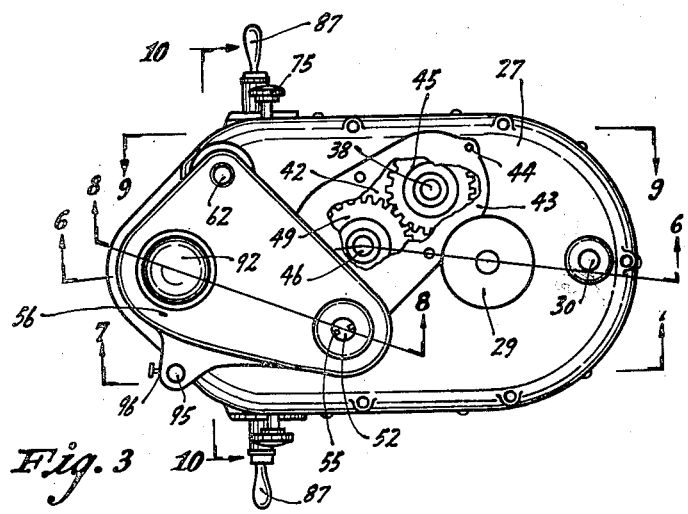
Fig. 3 is an enlarged plan view, partially broken away, of the machine as seen from the top of the sheet in Fig. 1.
Figure 4:
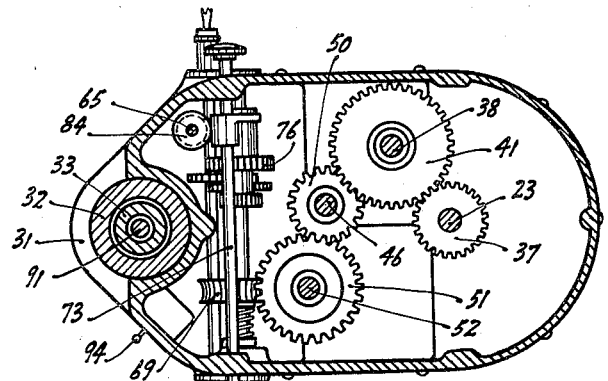
Fig. 4 is an enlarged, horizontal sectional view, taken on line 4—4 in Fig. 1.
Figure 5:
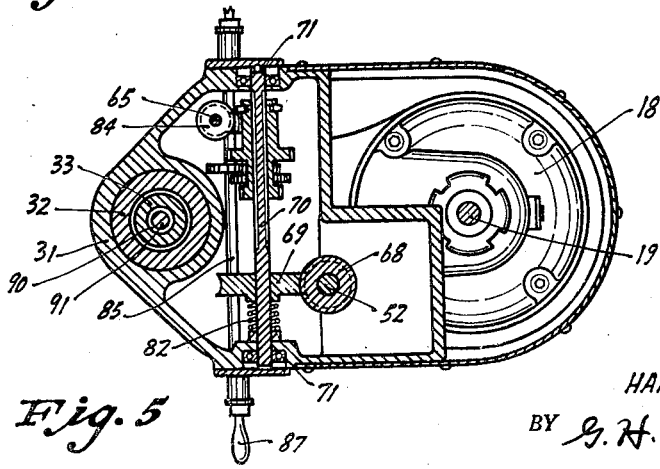
Fig. 5 is an enlarged, horizontal sectional view, taken on line 5—5 in Fig. 1.
Figure 7:
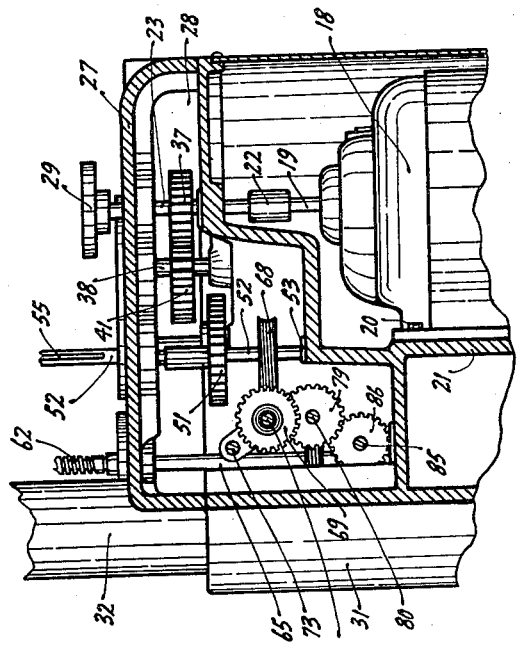
Fig. 7 is a fragmentary vertical sectional view, taken on line 7—7 in Fig. 3, disclosing an intermediate portion of the machine.
Figure 8:
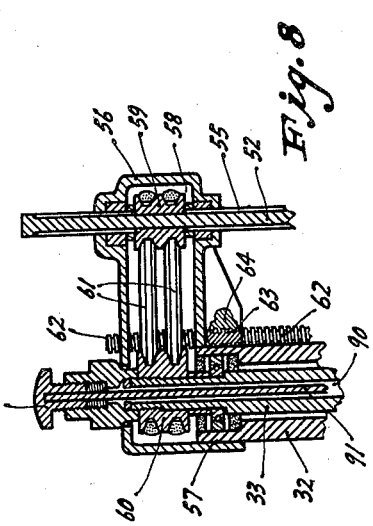
Fig. 8 is a fragmentary vertical sectional view, taken on line 8—8 in Fig. 3, disclosing an upper portion of the machine.
Figure 6:
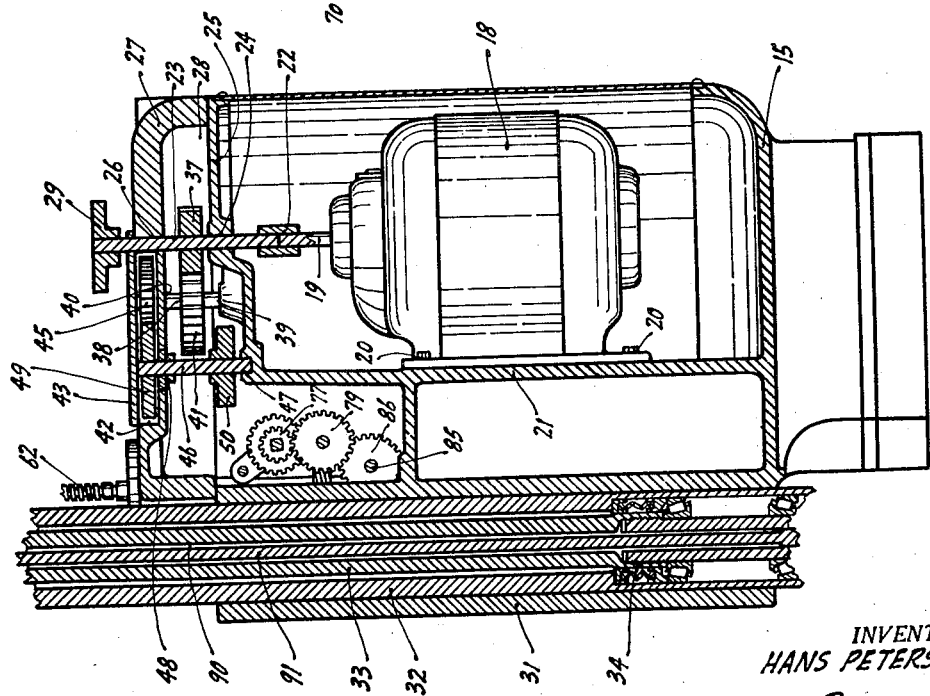
Fig. 6 is a fragmentary vertical sectional view, taken about as on line 6—6 in Fig. 3, disclosing a lower portion of the machine.

The cylinder boring or reboring machine includes a frame 15 adapted to rest upon an engine or cylinder block 16, in the manner as disclosed in Figs. 1 and 2, during operation of the machine, in position to operate upon cylinders 17 contained by said block 16.

The frame 15 suitably and conveniently supports an electric motor 18 including a vertically upwardly extending motor shaft 19. The electric motor 18 is bolted, as at 20, at one of its side portions to an upright member 21 of the frame 15.

The motor shaft 19 is suitably secured, as at 22, to a vertically upwardly extending shaft 23 adapted to be driven by the electric motor 18. A lower portion of the shaft 23 is mounted, as at 24, in a horizontal bearing member 25 constituting part of the frame 15 above the electric motor 18 and integral with the upright member 21. An upper portion of said shaft 23 is mounted, as at 26, in a cover or cap member 27 upon the frame 15. The length of the driven shaft 23 between its bearings 24 and 26 is situated in a space 28 between the horizontal bearing member 25 and the cover or cap member 27, and the upper end of said shaft 23 fixedly carries a horizontally arranged cutter or tool dresser 29 disposed at the outer side of and above the cover or cap member 27. A vertical rod 30 extending upwardly from said cover or cap member adjacent the cutter or tool dresser may provide a support or holder for a cutter or tool to be dressed.

The frame 15 integrally includes a hollow, vertical bearing post 31, and a vertical sleeve 32 is mounted to be reciprocated in said bearing post 31. Said vertical sleeve 32 may be held against rotary movement in the post 31 in any suitable and convenient manner. A cutter shaft 33 is rotatably mounted, as at 34, within the sleeve 32 and is fixed against longitudinal movement in said sleeve. A lower portion of the cutter shaft 33, below said sleeve 32, carries a centering device 35, and the lower end of said cutter shaft, below said centering device, carries a cutter head 36 with cutter or cutting means.

A gear 37 is fixed upon the vertical driven shaft 23 and is situated in the space 28. Said space 28 also houses a short vertical shaft 38 having its lower end mounted, as at 39, in the frame 15 and its upper portion mounted, as at 40, in the cover or cap member 27. A gear 41 is fixed to an intermediate portion of the short vertical shaft 38 in the space 28 and is in mesh with the gear 37. The upper portion of the cover or cap member 27 is hollowed out to provide a gear casing 42, and a cover plate 43 is removably secured, as at 44, to said gear casing 42. The gear casing 42 houses a gear 45 detachably or removably secured upon the upper portion of the short vertical shaft 38. A second short vertical shaft 46 is also housed in the space 28 and has its lower end mounted, as at 47, in the frame 15 and its upper portion mounted, as at 48, in said cover or cap member 27. Said gear casing 42 houses a second gear 49 which meshes with the gear 45 and is detachably or removably secured upon the upper portion of the short vertical shaft 46. The detachable or removable, intermeshing gears 45 and 49 may be of the same size or of different sizes. They are accessible when the cover plate 43 is removed to be interchangeable for the purpose of varying the rate of speed of drive and feed of the cutter or cutting means of the machine, as will hereinafter be made apparent. That is to say, the construction contemplates the employment of gears such as 45 and 49 which are readily accessible and are interchangeable to the end that any desired and selectively alterable gear ratio can be employed as a part of the operative connection from the electric motor 18 for driving and feeding the cutter or cutting means of the machine, so that the rate of speed of both drive and feed of said cutter or cutting means can be controllably varied and regulated. A lower portion of the short shaft 46 fixedly carries a gear 50 which is as disclosed situated in the space 28 at location below the gears 37 and 41.

The gear 50 meshes with a horizontally disposed gear 51 fixed upon a vertical shaft 52. The lower end of the shaft 52 is mounted, as at 53, in the frame 15 and an intermediate portion of said vertical shaft 52 is mounted, as at 54, in the cover or cap member 27. The vertical shaft 52 extends upwardly a considerable distance above said cover or cap member 27, and the upper portion of said vertical shaft 52 is splined, as at 55.

A fitting 56 is rigidly connected to the upper end portion of the vertical sleeve 32. As disclosed, the fitting 56 is secured, as at 57, about said vertical sleeve 32 and provides or supplies a chamber 58. The vertical shaft 52 extends upwardly through the chamber 58 and is rotatable and slidable in said fitting 56. Said vertical shaft 52 slidably carries a series of drive pulleys 59 fixed by the spline 55 to rotate with the shaft 52. The cutter shaft 33 likewise carries a series of drive pulleys 60 disposed in horizontal alinement with the drive pulleys 59 upon a part of the cutter shaft extending above the sleeve 32. All of the drive pulleys 59 and 60 are within the chamber 58 of the fitting 56, and drive belts 61, one for each of the drive pulleys 59, 60, ride over the drive pulleys of the different sets, respectively, to cause said pulleys 59 to be drivingly connected to said pulleys 60. It will be apparent that when the electric motor 18 is driven, the shaft 52 will be rotated to in turn rotate or drive the cutter shaft 33 through the instrumentality of the drive pulleys 59 and 60 and the drive belts 61.

Mechanism for causing the vertical sleeve 32, and with it the cutter shaft 33, to be reciprocated in the vertical bearing post 31 includes a vertical feed screw 62 projecting upwardly from the cover or cap member 27 upon the frame 15 and threaded, as at 63, in a lug or protuberance 64 rigid with the fitting 56. The upper end portion of said vertical feed screw 62 is freely movable vertically in and through said fitting 56. The lower end of the screw 62 is rigidly and fixedly secured to the upper end of a vertical shaft 65 which is rotatably mounted and fixed against longitudinal movement in the machine. As disclosed, the lower end of said vertical shaft 65 is mounted, as at 66, in a horizontal member of the frame 15, and the upper end of the shaft 65 is mounted, as at 67, in the cover or cap member 27, the bearing 67 being close to the lower end of the vertical feed screw 62.

The fitting 56, with pulleys 59, and the vertical sleeve 32, with the cutter shaft 33 and the pulleys 60, are caused to be fed up and down in the machine, or reciprocated vertically relatively to the frame 15, by rotation of the vertical feed screw 62. Devices are provided whereby said feed screw 62 can be driven or rotated by the electric motor 18 at a plurality of different rates of speed, in addition to the different rates for driving or rotating the feed screw 62 which the interchangeable intermeshing gears 45 and 49 are adapted to provide.

Figure 10:
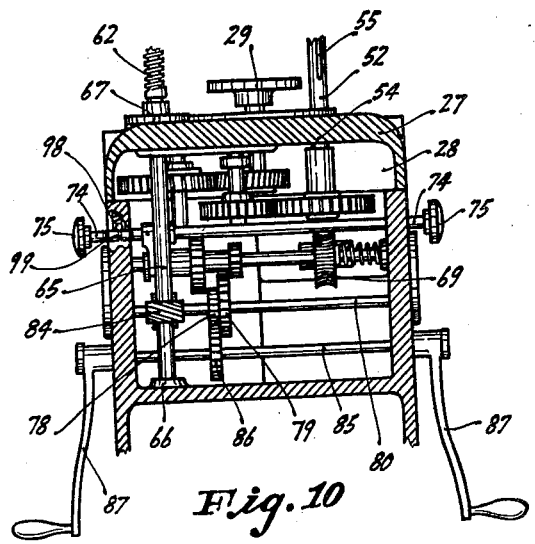
Fig. 10 is a fragmentary vertical sectional view, taken on line 10—10 in Fig. 3, disclosing an intermediate portion of the machine including a gear shifter device thereof in neutral position.
Figure 11:
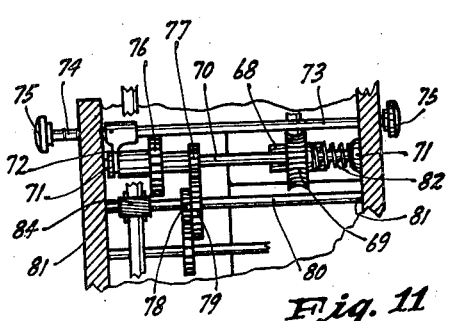
Fig. 11 is a fragmentary vertical sectional view disclosing the gear shifter device of Fig. 10 in low speed position.
Figure 12:
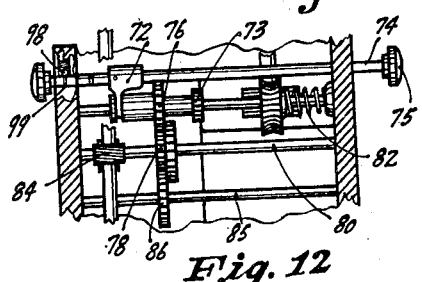
Fig. 12 is a fragmentary vertical sectional view disclosing the gear shifter device of Fig. 10 in high speed position.
Figure 13:
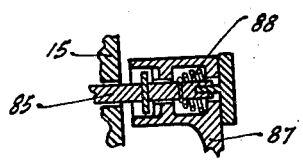
Fig. 13 is a detail sectional view, taken on line 13—13 in Fig. 1.
Figure 9:
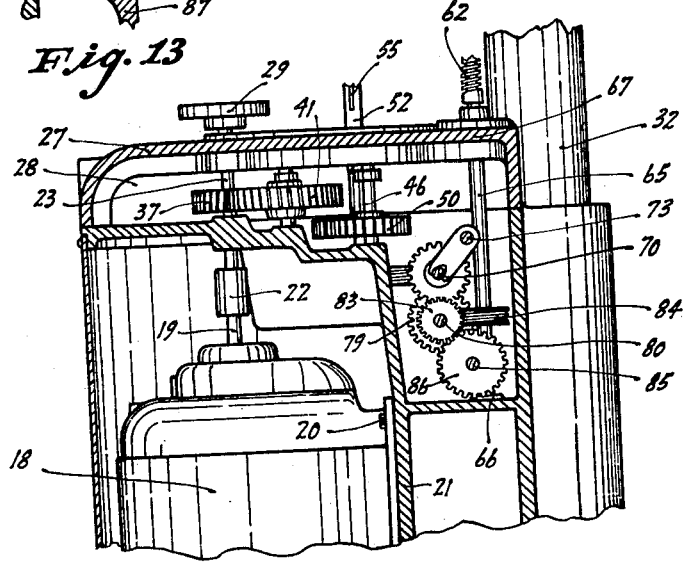
Fig. 9 is a fragmentary vertical sectional view, taken on line 9—9 in Fig. 3, disclosing an intermediate portion of the machine.

The vertical shaft 52 fixedly supports a worm gear 68 which is situated at elevation below the gear 51 adjacent the bearing 53, and said worm gear 68 is in continuous mesh with a vertically disposed worm gear 69 fixed upon a horizontal shaft 70. The horizontal shaft 70 is rotatably supported at its opposite ends, as at 71, by the frame 15. A shifter shaft 73 has its opposite end portions 74 slidably mounted in and extending beyond portions of the frame 15 at either side thereof, and each end portion 74 fixedly carries a hand piece 75. Said horizontal shaft 70 slidably supports spaced apart gears 76 and 77 constituted as a part of a gear shifter device which also includes spaced apart gears 78 and 79 fixed upon a horizontal shaft 80 having its opposite end portions mounted, as at 81, in said frame 15. The gears 76 and 77 are fixed to rotate with the shaft 70. The gear 76 is larger than the gear 77, and the gear 78 is smaller than the gear 79. By grasping either hand piece 75 and causing the shifter shaft 73 to be slid longitudinally the gears 76, 77 and 78, 79 can by reason of longitudinal movement of the gears 76 and 77 through the instrumentality of the shifter arm 72 in response to movement of said shifter shaft 73 be selectively positioned out of mesh as in Fig. 10, or so that the gears 77 and 79 interengage as in Fig. 11, or so that the gears 76 and 78 interengage as in Fig. 12. The gear shifter shaft 73 may be held in any of its intended positions by a spring pressed ball 98 suitably supported by the frame 15 and adapted to selectively lie in spaced apart slots 99 in the shaft 73. In Fig. 10 the gear shifter device is in neutral position, in Fig. 11 said gear shifter device is in condition to accomplish feed of the cutter or cutting means of the machine at relatively slow speed, and in Fig. 12 the gear shifter device is in condition to accomplish feed of said cutter or cutting means at comparatively faster speed. A coil spring 82 on said shaft 70 and between a wall of the frame 15 and said worm gear 69 is for the purpose of resiliently maintaining said shaft 70 in its proper and desired position. The shaft 80 fixedly carries a worm gear 83 which meshes with a worm gear 84 fixed upon the vertical shaft 65.

It will be evident that upon operation of the electric motor 18 while either of the sets of gears 76, 78 or 77, 79 is interengaged, the feed screw 62 will be rotated or driven through the instrumentality of the operative connections between said electric motor and said feed screw as set forth, and that the speed of rotation of the screw will be greater when the gears 76 and 78 are interengaged than when the gears 77 and 79 are interengaged. The electric motor 18 is reversible, and, obviously, rotation of the screw 62 will cause movement of the fitting 56 along the length of the screw, upwardly or downwardly, depending upon the direction of rotation of said screw.

The machine includes means for manually rotating the feed screw 62 in either direction to accomplish upward or downward reciprocation of the vertical sleeve 32 independently of the mechanical drive for said screw. As shown, such means includes a horizontal shaft 85 mounted in and extending beyond opposite walls of the frame 15. The shaft 85 fixedly carries a gear 86 which meshes with the gear 78 fixed upon the shaft 80 carrying the worm gear 83, and a handle 87 upon each end of said shaft 85 is for accomplishing manual rotation of the shaft. Each handle 87 is selectively attachable to and detachable from the shaft 85 by a usual clutch mechanism 88. An ordinary purpose of manual feed of the vertical sleeve 32 with cutter or cutting means of the machine is to raise or lower said cutter or cutting means while the cutter shaft 33 is not being rotated in the operation of positioning the cutter or cutting means relatively to the work. The manual feed may be accomplished while the gear shifter device is in neutral position.

A clamping device 89, disclosed in Figs. 1 and 2, is for the purpose of fastening the machine down upon an engine or cylinder block, such as 16, in proper position for operation upon a cylinder, such as 17, by the cutter or cutting means of the machine, by movement of said cutter or cutting means along the wall of said cylinder. The clamping device 89 may be of any ordinary or preferred construction.

The machine will of course be set upon an engine or cylinder block so that the cutter shaft 33 and the cutter or cutting means are properly centered relatively to a cylinder to be bored or rebored, before the frame of the machine is clamped or fastened down upon said block. The centering device 35 is for properly centering said cutter shaft 33 and cutter or cutting means and includes a centering head (not shown) at the inner side thereof. The cutter shaft 33 includes an axial passageway 90, and a rod 91 slidably mounted in said axial passageway is for the purpose of manipulating centering elements of said centering device 35. The upper end portion of the rod 91 is associated with a hand piece 92 for causing said rod 91 to be slid selectively upwardly or downwardly in the operation of manipulating said centering elements of the centering device. In practice, the cutter shaft 33 is lowered or depressed to situate the centering device 35 within a cylinder to be bored or rebored, and with said centering device so situated, the rod 91 is manipulated to actuate the centering elements and thus center the cutter or cutting means. During a boring or reboring operation the centering elements are at their withdrawn position, entirely within the centering head of the centering device 35.

The machine includes means for automatically stopping the rotation and feed of the cutter shaft 33 at the completion of its downward movement. An electric switch for the motor 18 is denoted 93 and an actuator lever for said switch 93 is indicated 94. The lever 94 is adapted to be moved to neutral position to cut off power to the electric motor 18 from a source not shown when said cutter shaft completes its downward reciprocation and thus cause said motor to come to rest. An actuator rod 95 is mounted, as at 96, for longitudinally adjustable movement upon the vertical sleeve 32, and the lower end 97 of said actuator rod 96 is adapted to engage the lever 94 and throw it to neutral position of the switch 93 upon downward movement of said vertical sleeve.

It will be seen that by employment of the interchangeable and replaceable gears such as 45 and 49 the drive and feed of the cutter or cutting means of the machine can each be accomplished at any desired or predetermined, controlled and nicely regulated rate of speed, and by employment of the gear shifter device including the gears 76, 77, 78 and 79 the rate of speed of feed of said cutter or cutting means can be further varied, controlled and regulated.

What is claimed is:

1. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, and a common operative connection between said motor and each of said means including a motor shaft, a gear fixed upon said motor shaft, a rotatably mounted shaft, a gear fixed upon said rotatably mounted shaft and meshing with said gear fixed upon said motor shaft, a second rotatably mounted shaft, a gear fixed upon said second rotatably mounted shaft and drivingly connected to both of said means, and accessible, interengaging gears fixed upon said rotatably mounted shaft and said second rotatably mounted shaft, respectively, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed.

2. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a common operative connection between said motor and each of said means including a motor shaft, a gear fixed upon said motor shaft, a rotatably mounted shaft, a gear fixed upon said rotatably mounted shaft and meshing with said gear fixed upon said motor shaft, a second rotatably mounted shaft, a gear fixed upon said second rotatably mounted shaft and drivingly connected to both of said means, and accessible interengaging gears fixed upon said rotatably mounted shaft and said second rotatably mounted shaft, respectively, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed, and a gear shifter device for making and breaking the driving connection between said gear fixed upon said second rotatably mounted shaft and said means for causing the cutter shaft to be reciprocated and for altering the rate of speed of reciprocation of said cutter shaft.

3. In a cylinder boring machine, a frame, a cutter shaft rotatably and reciprocably carried by said frame, means for causing said cutter shaft to be reciprocated, means for causing said cutter shaft to be rotated, an electric motor for actuating each of said means, a gear casing upon said frame and opening to an outer side thereof, and a common operative connection between said motor and each of said means including a motor shaft, a gear fixed upon said motor shaft, a rotatably mounted shaft, a gear fixed upon said rotatably mounted shaft and meshing with said gear fixed upon said motor shaft, a second rotatably mounted shaft, a gear fixed upon said second rotatably mounted shaft, a driving connection between said gear fixed upon said second rotatably mounted shaft and both of said means, and accessible, interengaging gears situated in said gear casing and fixed upon said rotatably mounted shaft and said second rotatably mounted shaft, respectively, said interengaging gears being adapted to be interchanged to render said means for causing said cutter shaft to be reciprocated capable of reciprocating the cutter shaft at variable rates of speed and to render said means for causing said cutter shaft to be rotated capable of rotating the cutter shaft at variable rates of speed.

4. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a gear casing upon said frame and opening to an outer side thereof, a common operative connection between said motor and each of said means including a motor shaft, a gear fixed upon said motor shaft, a rotatably mounted shaft, a gear fixed upon said rotatably mounted shaft and meshing with said gear fixed upon said motor shaft, a second rotatably mounted shaft, a gear fixed upon said second rotatably mounted shaft, a driving connection between said gear fixed upon said second rotatably mounted shaft and both of said means, and accessible, interengaging gears situated in said gear casing and fixed upon said rotatably mounted shaft and said second rotatably mounted shaft, respectively, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed, and a gear shifter device for making and breaking the driving connection between said gear fixed upon said second rotatably mounted shaft and said means for causing the cutter shaft to be reciprocated and for altering the rate of speed of reciprocation of said cutter shaft.

5. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a gear casing upon said frame and opening to an outer side thereof, a common operative connection between said motor and each of said means including a motor shaft, a gear fixed upon said motor shaft, a rotatably mounted shaft, a gear fixed upon said rotatably mounted shaft and meshing with said gear fixed upon said motor shaft, a second rotatably mounted shaft, a gear fixed upon said second rotatably mounted shaft, a driving connection between said gear fixed upon said second rotatably mounted shaft and both of said means, and accessible, interengaging gears situated in said gear casing and fixed upon said rotatably mounted shaft and said second rotatably mounted shaft, respectively, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed, and mechanism included as a part of said means for causing said cutter shaft to be reciprocated and constituted as a gear shifter device accessible at the outer side of said frame for altering the rate of speed of reciprocation of the cutter shaft, said mechanism being independent of said interengaged, interchangeable gears and of said means for causing said cutter shaft to be rotated.

6. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a gear casing upon said frame above said electric motor and opening to an outer side of the frame, and a common operative connection between said motor and each of said means including an upright motor shaft, a gear fixed upon said motor shaft, an upright rotatably mounted shaft, a gear fixed upon a lower portion of said upright rotatably mounted shaft and meshing with said gear fixed upon said motor shaft, a second upright rotatably mounted shaft, a gear fixed upon a lower portion of said second upright rotatably mounted shaft, a driving connection between said gear fixed upon said second upright rotatably mounted shaft and both of said means, and interengaging gears situated in said gear casing and fixed upon an upper portion of said upright rotatably mounted shaft and an upper portion of said second upright rotatably mounted shaft, respectively, to be accessible at the outer side of said frame, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed.

7. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a gear casing upon said frame above said electric motor and opening to an outer side of the frame, a common operative connection between said motor and each of said means including an upright motor shaft, a gear fixed upon said motor shaft, an upright rotatably mounted shaft, a gear fixed upon a lower portion of said upright rotatably mounted shaft and meshing with said gear fixed upon said motor shaft, a second upright rotatably mounted shaft, a gear fixed upon a lower portion of said second upright rotatably mounted shaft, a driving connection between said gear fixed upon said second upright rotatably mounted shaft and both of said means, and interengaging gears situated in said gear casing and fixed upon an upper portion of said upright rotatably mounted shaft and an upper portion of said second upright rotatably mounted shaft, respectively, to be accessible at the outer side of said frame, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed, and a gear shifter device accessible at the outer side of said frame for making and breaking the driving connection between said gear fixed upon said second upright rotatably mounted shaft and said means for causing the cutter shaft to be reciprocated and for altering the rate of speed of reciprocating of said cutter shaft.

8. In a cylinder boring machine, a frame, a cutter shaft rotatably and reciprocably carried by said frame, means for causing said cutter shaft to be rotated, means for causing said cutter shaft to be reciprocated, an electric motor for actuating each of said means, a gear casing upon said frame above said electric motor and opening to an outer side of the frame, a common operative connection between said motor and each of said means including an upright motor shaft, a gear fixed upon said motor shaft, an upright rotatably mounted shaft, a gear fixed upon a lower portion of said upright rotatably mounted shaft and meshing with said gear fixed upon said motor shaft, a second upright rotatably mounted shaft, a gear fixed upon a lower portion of said second upright rotatably mounted shaft, a driving connection between said gear fixed upon said second upright rotatably mounted shaft and both of said means, and interengaging gears situated in said gear casing and fixed upon an upper portion of said upright rotatably mounted shaft and an upper portion of said second upright rotatably mounted shaft, respectively, to be accessible at the outer side of said frame, said interengaging gears being adapted to be interchanged to render said means for causing said cutter shaft to be rotated capable of rotating the cutter shaft at variable rates of speed and to render said means for causing said cutter shaft to be reciprocated capable of reciprocating the cutter shaft at variable rates of speed, and mechanism included as a part of said means for causing said cutter shaft to be reciprocated and constituted as a gear shifter device accessible at the outer side of said frame for altering the rate of speed of reciprocation of the cutter shaft, said mechanism being independent of said common operative connection and the interengaging, interchangeable gears thereof.

HANS PETERSEN.